United States Patent
Terada et al.

(10) Patent No.: US 10,502,354 B2
(45) Date of Patent: Dec. 10, 2019

(54) QUICK CONNECTOR

(71) Applicant: Sumitomo Riko Company Limited, Komaki-shi, Aichi (JP)

(72) Inventors: Hideo Terada, Komaki (JP); Ryousuke Kanegae, Komaki (JP); Kazuki Hatanaka, Komaki (JP)

(73) Assignee: Sumitomo Riko Company Limited, Komaki-shi (JP)

( * ) Notice: Subject to any disclaimer, the term of this patent is extended or adjusted under 35 U.S.C. 154(b) by 343 days.

(21) Appl. No.: 15/584,164

(22) Filed: May 2, 2017

(65) Prior Publication Data

US 2017/0248263 A1    Aug. 31, 2017

Related U.S. Application Data

(63) Continuation of application No. PCT/JP2016/075773, filed on Sep. 2, 2016.

(30) Foreign Application Priority Data

Sep. 24, 2015  (JP) ................. 2015-186653

(51) Int. Cl.
*F16L 37/14*    (2006.01)
(52) U.S. Cl.
CPC .................. *F16L 37/144* (2013.01)
(58) Field of Classification Search
CPC ..... F16L 37/144; F16L 37/142; F16L 37/148; F16L 37/088
USPC ................................................ 285/305, 319
See application file for complete search history.

(56) References Cited

U.S. PATENT DOCUMENTS

| | | | | |
|---|---|---|---|---|
| 2012/0326435 | A1* | 12/2012 | Okazaki | F16L 37/088 285/84 |
| 2014/0339821 | A1* | 11/2014 | Ishizaka | F16L 37/12 285/319 |
| 2015/0159793 | A1* | 6/2015 | Nagaya | F16L 37/088 285/93 |
| 2016/0230913 | A1* | 8/2016 | Hatanaka | F16L 37/144 |
| 2017/0067588 | A1* | 3/2017 | Chaupin | F16L 37/088 |
| 2017/0146173 | A1* | 5/2017 | Chaupin | F16L 37/1225 |
| 2018/0306363 | A1* | 10/2018 | Oberdorfer | F16L 37/088 |

FOREIGN PATENT DOCUMENTS

JP    5753284 B1    7/2015

OTHER PUBLICATIONS

Oct. 11, 2016 International Search Report issued with International Patent Application No. PCT/JP2016/075773.

* cited by examiner

*Primary Examiner* — Aaron M Dunwoody
(74) *Attorney, Agent, or Firm* — Oliff PLC

(57) ABSTRACT

A quick connector includes paired first legs having a first push-in inhibiting protrusion, and paired second legs having a second push-in inhibiting protrusion. Although the first push-in inhibiting protrusions inhibit the push-in movements of a retainer in a state before a pipe is inserted, they do not inhibit the push-in movements of the retainer in such another state as the pipe is located at a midway position. The second push-in inhibiting protrusions inhibit the push-in movements of the retainer in the other state where the pipe is located at the midway position.

17 Claims, 10 Drawing Sheets

QUICK CONNECTOR

CROSS REFERENCE TO RELATED APPLICATIONS

The present application is a Continuation Application of International Application No. PCT/JP2016/075773, filed on Sep. 2, 2016, which is incorporated herein by reference. The present invention is based on Japanese Patent Application No. 2015-186653, filed on Sep. 24, 2015, the entire contents of which are incorporated herein by reference.

BACKGROUND OF THE INVENTION

1. Field of the Invention

The present invention relates to a quick connector.

2. Description of the Related Art

A quick connector set forth in Japanese Patent Gazette No. 5753284 comprises a connector body, and a retainer having a checking function. In such a state as a pipe is located at an axially regular position in the connector body, the retainer is subjected to a push-in operation with respect to the connector body so that the retainer is locked to an annular boss of the pipe to prevent the pipe from coming off.

The quick connector further comprises paired come-off preventing legs. The paired come-off preventing legs include a temporary come-off preventing portion, and an actual come-off preventing portion, respectively. The temporary come-off preventing portions allow the annular boss of the pipe to pass toward an inner side by deforming the paired come-off preventing legs to open expansively accompanied by coming into contact with the annular boss in such a state as the retainer is located at an initial position. Then, when the pipe arrives at the regular position, the temporary come-off preventing portions lock to the annular boss in the axial direction to prevent the pipe from coming off by decreasing an expansive-opening deformation magnitude of the paired come-off preventing legs. The actual come-off preventing portions lock with respect to the annular boss in the axial direction to prevent the pipe from coming off in such another state as the retainer is located at a confirmation position.

SUMMARY OF THE INVENTION

First Problem

In the conventional quick connector, push-in inhibiting protrusions are disposed so as to inhibit the retainer from being pushed in with respect to the connector body in such a state as the pipe is not located at the regular position. The push-in inhibiting protrusions are disposed on a leading-end side in the paired come-off preventing legs capable of opening expansively, respectively. However, the annular boss opens the paired come-off preventing legs expansively in such another state as the pipe is located at a midway position that is located on a more axially frontal side (namely, on a side into which the pipe is to be inserted more inside the connector body) than is the regular position. Under the circumstances, such a fear might possibly arise as the retainer is pushed in to move with respect to the connector body, because the push-in inhibiting protrusions are not locked with respect to the connector body.

Second Problem

Moreover, in the conventional quick connector, the temporary come-off preventing portions and actual come-off preventing portions are located on a more axially frontal side than is the annular boss in such a state as the pipe is located at the regular position. On the other hand, the push-in inhibiting protrusions are located on a more axially inner side than is the annular boss in the state where the pipe is located at the regular position. Consequently, when the pipe is put in the state of being located at the regular position, and when the retainer is put in the state of being located at the initial position, an axially movable magnitude of the pipe is small, because the annular boss is interposed in the axial interspaces between the temporary come-off preventing portions and the push-in inhibiting protrusions. However, in the state where the pipe is located at the regular position, and in the state where the retainer is located at the confirmation position, although the annular boss is locked to the actual come-off preventing portions in the axial direction, it is not locked to the push-in inhibiting protrusions in the axial direction. Consequently, under the circumstances, the axially movable magnitude of the pipe becomes large. Therefore, it is sought for to inhibit the pipe from moving in the axial direction.

Third Problem

Moreover, in the conventional quick connector, the retainer includes attitude control legs for controlling attitudes of the retainer with respect to the connector body. Note herein that the attitude control legs are legs that are independent of the paired come-off preventing legs having the actual come-off preventing portion and temporary come-off preventing portion. In addition, a slit is formed at the axial interspaces between the attitude control legs and the paired come-off inhibiting legs. Moreover, in such a state as the retainer is located at the initial position, the retainer gets rickety with respect to the connector body because of the existence of the slits between the paired come-off preventing legs and the attitude control legs. Therefore, it is sought for to suppress the retainer from getting rickety with respect to the connector body.

Fourth Problem

Moreover, in the conventional quick connector, the temporary come-off preventing portions lock to the annular boss to prevent the pipe from coming off even in such a state as the retainer is located at the initial position. However, it is sought for to further enhance a come-off preventing force resulting from the temporary come-off preventing portions.

The present invention is aimed at providing a quick connector capable of solving the first problem at least. Specifically, the present invention is aimed at providing a quick connector making it possible to disenable the retainer to undergo any push-in movements unless the pipe is located at the regular position.

A quick connector directed to the present invention comprises: a connector body into which a pipe having an annular boss is insertable; and a retainer moving from an initial position to a confirmation position with respect to the connector body by a push-in operation in a direction that intersects with an axial direction of the connector body in such a state as the pipe is inserted into the connector body to a regular position in the axial direction of the connector body, the retainer preventing the pipe from coming off by axially locking to the annular boss at the confirmation position.

The retainer includes: a base; paired first legs disposed at opposite ends of the base, and being capable of opening expansively; and paired second legs disposed at the opposite ends of the base, disposed independently of the paired first legs, and exhibiting a smaller expansive opening magnitude than that of the paired first legs.

The paired first legs are provided with a first push-in inhibiting protrusion disposed on a leading-end side of the paired first legs, and inhibiting the retainer from moving from the initial position to the confirmation position. The paired second legs are provided with a second push-in inhibiting protrusion disposed on a leading-end side of the paired second legs, and inhibiting the retainer from moving from the initial position to the confirmation position.

The first push-in inhibiting protrusions inhibit the retainer from moving from the initial position to the confirmation position by being locked to the connector body in such another state as the retainer is located at the initial position and the pipe is not inserted into the connector body.

The first push-in inhibiting protrusions cancel the locking to the connector body by the paired first legs that open expansively accompanied by coming into contact with the annular boss in such still another state as the retainer is located at the initial position and the pipe is located at a midway position that is located on a more axially frontal side than is the regular position.

The second push-in inhibiting protrusions inhibit the retainer from moving from the initial position to the confirmation position by coming into contact with the annular boss of the pipe in a direction of pushing in the retainer in the still other state where the retainer is located at the initial position and the pipe is located at the midway position.

That is, each of the paired first legs and paired second legs is provided with a push-in inhibiting protrusion. Therefore, the first push-in inhibiting protrusions and second push-in inhibiting protrusions make it feasible to inhibit the retainer from being pushed in the two states. To put it in detail, the first push-in inhibiting protrusions function in such a state as the pipe is not inserted. The second push-in inhibiting protrusions function in such another state as the pipe is located at the midway position. Therefore, the retainer comes not to undergo any push-in movements even in the other state where the pipe is located at the midway position.

DESCRIPTION OF THE EMBODIMENTS (1) Outline of Quick Connector 1

The outline of a quick connector 1 will be explained with reference to FIG. 1 and FIG. 7E. The quick connector 1 constructs part of the fuel piping in a vehicle, for instance; namely, it forms a flow passage for distributing a fuel. On one of the opposite-end sides of the quick connector 1, an opposite end of a resinous tube 4 is fitted around it externally; whereas, on another one of the opposite-end sides of the quick connector 1, an opposite end of a pipe 3 is inserted into it. In this way, the quick connector 1 connects the resinous tube 4 with the pipe 3.

Figure 1:
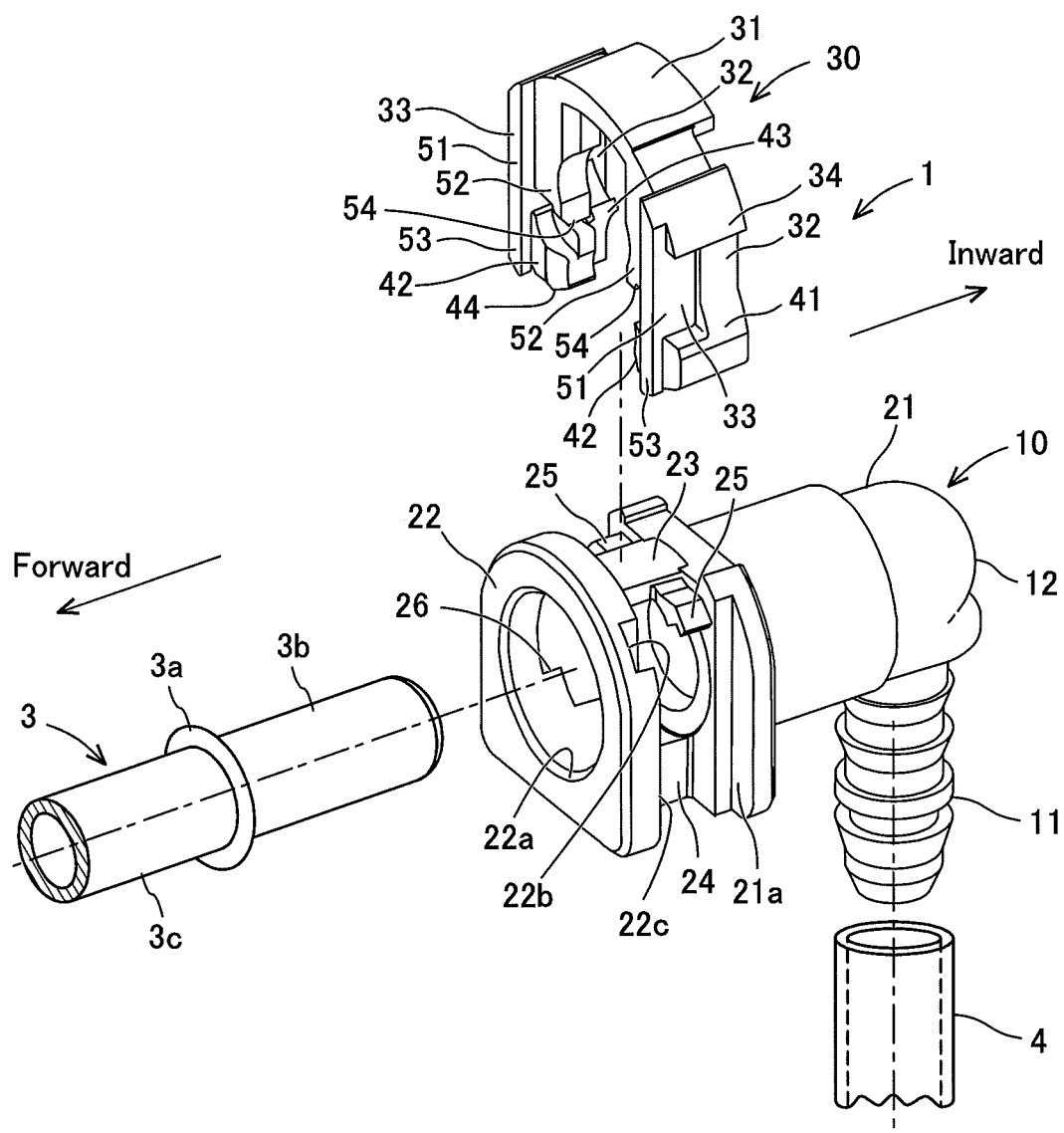
FIG. 1 is a perspective diagram of a connector body 10 and a retainer 30, which construct a quick connector 1 that is put in a state before being assembled with the retainer 30, a pipe 3 and a resinous tube 4.

Note herein that the pipe 3 is formed in a tubular shape as shown in FIG. 1, and is made of metal, for instance. The pipe 3 comprises an annular boss 3a (might be referred to as a "flanged portion" or "bead" as well) formed to protrude radially outward at a position that is separated off at a distance from the leading end in the axial direction, a leading-end portion 3b making a minor-diameter site that is disposed on a more leading-end side than is the annular boss 3*a*, and an intermediate portion 3*c* making another minor-diameter site that is disposed on a more counter leading-end side than is the annular boss 3*a*.

Moreover, in the following explanations, the term, an "axial direction," is the axial direction of the pipe 3 in such a state as the pipe 3 is inserted into the quick connector 1. A side into which the pipe 3 is inserted into a connector body 10 is labeled an "axially frontal side" (equivalent to a "pipe-insertion side"); whereas the opposite side is labeled an "axially inner side" (equivalent to a "pipe counter-insertion side"). When the quick connector 1 is viewed from the axial direction of the pipe 3, a "downward direction" is the direction of pushing a retainer 30 in; whereas an "upward direction" is the direction of pulling the retainer 30 out (i.e., the counter push-in direction). In addition, the term, a "right/left direction" is the direction crossing with the upward/downward direction orthogonally when the quick connector 1 is viewed from the axial direction of the pipe 3.

Figure 7A:
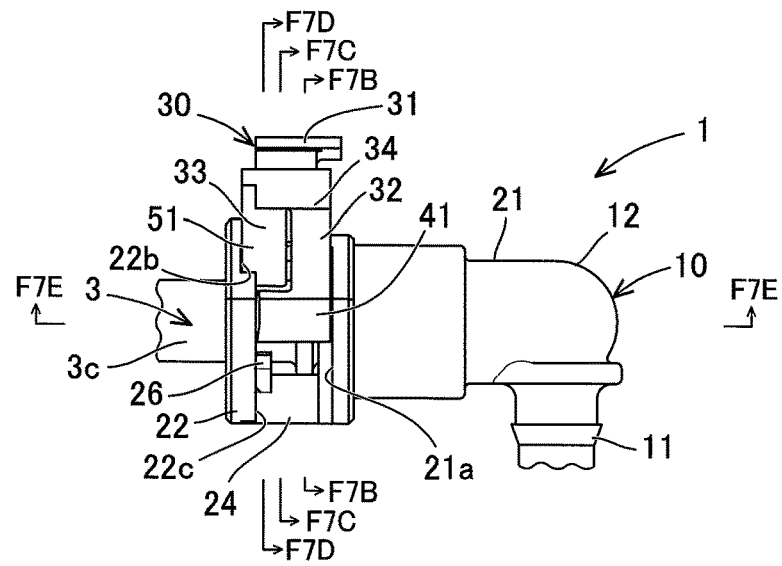
FIG. 7A is a side view illustrating still another state where the retainer 30 is located at the initial position while the pipe 3 is inserted into the quick connector 1 to the regular position therein (i.e., a pipe-insertion completed state)
Figure 7B:
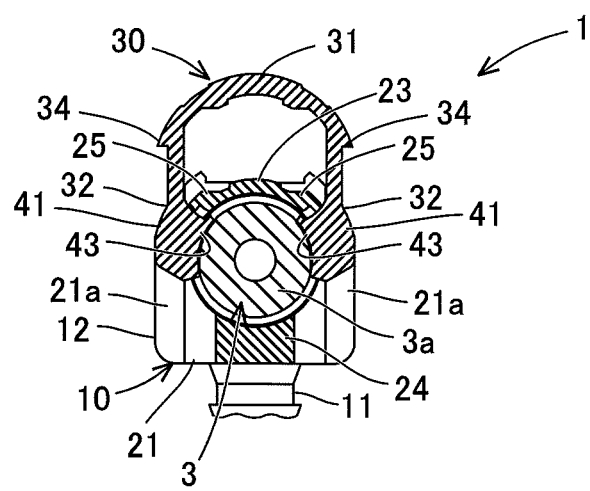
FIG. 7B is a cross-sectional diagram taken along the line "F7B"-"F7B" shown in FIG. 7A.
Figure 7C:
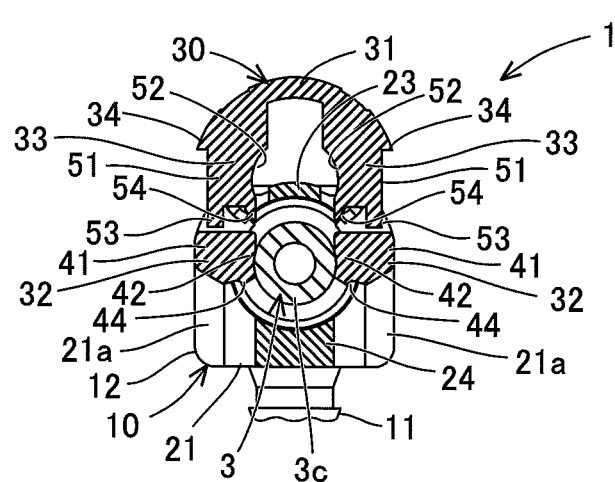
FIG. 7C is a cross-sectional diagram taken along the line "F7C"-"F7C" shown in FIG. 7A.
Figure 7D:
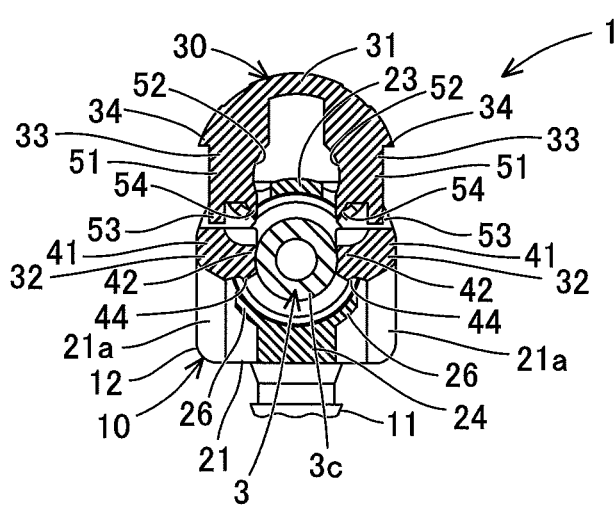
FIG. 7D is a cross-sectional diagram taken along the line "F7D"-"F7D" shown in FIG. 7A.
Figure 7E:
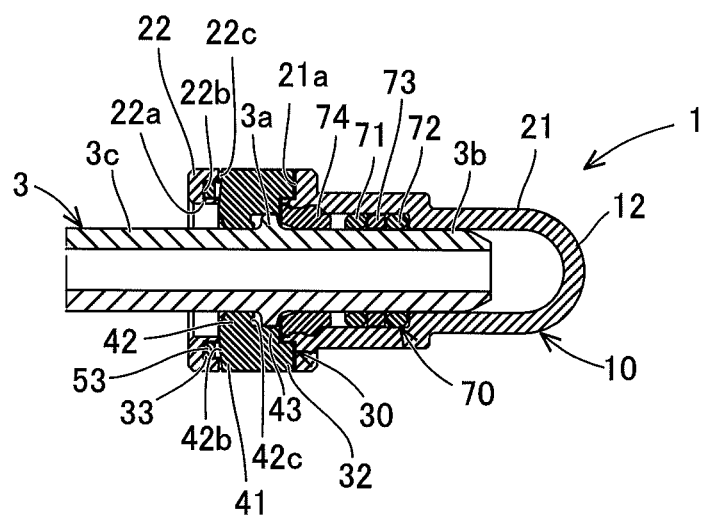
FIG. 7E is a cross-sectional diagram taken along the line "F7E"-"F7E" shown in FIG. 7A.

The quick connector 1 comprises the connector body 10, the retainer 30, and a seal unit 70 (shown in FIG. 7E).

The connector body 10 is made of glass-fiber reinforced polyamide, for instance, and has a flow passage penetrating therethrough. Although the connector body 10 takes on a configuration formed to be penetrated in a letter-"L" shape, it is also allowable that, in addition to the above, it can be formed so that the resulting flow passage is formed to be penetrated linearly. Moreover, it is even permissible that, not limited to such a case as being molded integrally, the connector body 10 can be formed by coupling multiple component parts together.

As illustrated in FIG. 1, the connector body 10 includes a tube-connection portion 11, and a pipe-insertion portion 12. The tube-connection portion 11 is disposed on one of the opposite end sides in the connector body 10 (i.e., on the inner lower side in FIG. 1), and the resinous tube 4 is fitted externally around the tube-insertion portion 11. The tube-connection portion 11 is formed on the outer peripheral face as a stepped shape in a direction, which follows along the flow passage, in order to make it exhibit a come-out preventive force in such a state as the resinous tube 4 is fitted around it.

The pipe-insertion portion 12 is disposed on another one of the opposite end sides in the connector body 10 (i.e., the upper side in FIG. 1), and is made so as to make the sites of the pipe 3, such as the leading-end portion 3*b* and annular boss 3*a*, insertable thereinto. As illustrated in FIG. 7E, the seal unit 7 is arranged on the inner peripheral side of the pipe-insertion portion 12. For example, the seal unit 70 includes: annular sealing members (71, 72), which are made of fluoro rubber; a collar 73, which is made of resin and is disposed so as to be interposed between the annular sealing members (71, 72) in the axial direction; and a bushing 74, which are made of resin and carries out positioning the annular sealing members (71, 72) and collar 73 in the connector body 10. On the inner peripheral side of the seal unit 70, the leading-end portion 3*b* of the pipe 3 is inserted thereinto. Although the bushing 74 allows the leading-end portion 3*b* of the pipe 3 to pass therethrough, it does not allow the annular boss 3*a* to pass therethrough. That is, the bushing 74 has a function of inhibiting the annular boss 3*a* of the pipe 3 from moving toward an axially inner side thereof.

The retainer 30 is made of glass-fiber reinforced polyamide, for instance. The retainer 30 is disposed in the connector body 10 movably by means of a push-in operation and pullout operation in a radial direction (i.e., in a direction intersecting with the pipe-insertion axial direction in the connector body 10, namely, in the up/down direction) by an operator.

Although the following will be described later, the retainer 30 becomes movable from the initial position to the confirmation position in such a state as the pipe 3 is inserted into the connector body 10 to the regular position in the axial direction. On the other hand, the retainer 30 is inhibited from moving from the initial position to the confirmation position in such another state as the pipe 3 is not inserted into the connector body 10, and in such still another state as the pipe 3 is inserted into the connector body 10 only up to a midway position that is on a more axially frontal side than is the regular position. Therefore, an operator or worker can confirm that the pipe 3 is inserted to the regular position when he or she can operate the retainer 30 to push in.

In addition, the retainer 30 axially locks to the annular boss 3*a* of the pipe 3 so that the retainer 30 prevents the pipe 3 from coming off in such a state as the retainer 3 is subjected to a push-in operation toward the confirmation position. That is, an operator or worker can confirm the following by operating the retainer 3 to push in: the pipe 3 is inserted to the regular position; and the pipe 3 is prevented from coming off by the retainer 30.

(2) Detailed Constructions of Pipe-Insertion Portion 12 of Connector Body 10

Figure 2:
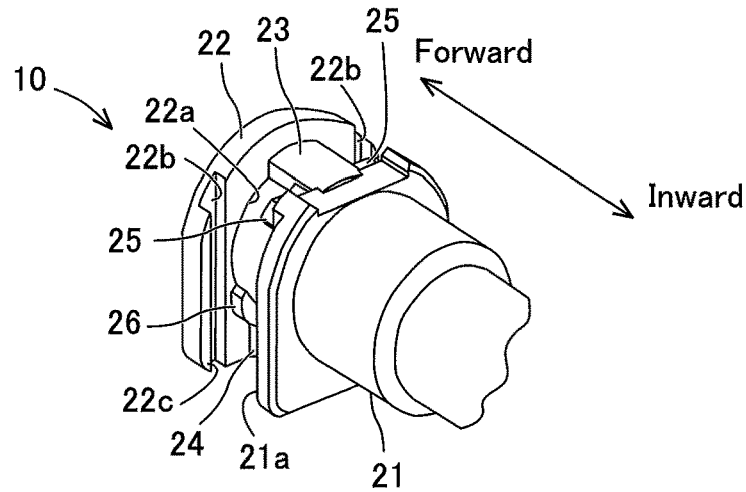
FIG. 2 is a perspective diagram in which the connector body 10 shown in FIG. 1 is viewed from the inner side.

Detailed constructions of the pipe-insertion portion 12 will be hereinafter explained with reference to FIG. 1 and FIG. 2. The pipe-insertion portion 12 is provided with a tubular section 21, an opening-end seat member 22, an upside connector member 23, a downside connector member 24, paired pullout locked sections (25, 25), and paired push-in locked sections (26, 26).

The tubular section 21 is located on an inner side in the pipe-insertion portion 12. At one of the opposite ends of the tubular section 21, the tube-connection portion 11 is connected therewith. The seal unit 70 is arranged in the tubular section 21, and the leading-end portion 3*a* of the pipe 3 is inserted thereinto. Paired guides (21*a*, 21*a*) are formed to extend linearly in the up/down direction on the right and left of an opening in the front end face of the tubular section 21.

The opening-end seat member 22 is arranged coaxially on an axially frontal side separated off at a distance from the tubular section 21. A circularly-opened bore 22*a* is formed in the opening-end seat member 22. The circularly-opened bore 22*a* is formed in such a size as enabling the annular boss 3*a* of the pipe 3 to pass therethrough. Moreover, paired rail grooves (22*b*, 22*b*) are formed to extend linearly in the up/down direction on the right and left of the circularly-opened bore 22*a* on one of the faces of the opening-end seat member 22, namely, on the inner face thereof. The grooved bottoms and outside shoulders (22*c*, 22*c*) of the paired rail grooves (22*b*, 22*b*) oppose the paired guides (21*a*, 21*a*) of the tubular section 21 in the axial direction.

Note that, although the following will be described later, the paired guides (21*a*, 21*a*) and paired outside shoulders (22*c*, 22*c*) guide a first leg-portion body 41 of the retainer 30 in the up/down direction. That is, a front face of the guide 21*a* of the tubular section 21, and an inner face of the outside shoulder 22*c* function as opposing inhibitor faces that inhibit the later-described first leg-portion body 41 of the retainer 30 from moving in both the axially opposite directions. Moreover, the paired rail grooves (22*b*, 22*b*) guide a second leg-portion body 51 and insertion guide 53 in the up/down direction.

The upside connector member 23 connects an upside of the tubular section 21 with an upside of the opening-end seat member 22 in the axial direction. The downside connector member 24 connects a downside of the tubular section 21 with a downside of the opening-end seat member 22 in the axial direction. Note herein that the upside connector member 23 and downside connector member 24 are disposed at a position where they do not interfere with the annular boss 3a of the pipe 3 in the axial direction. Moreover, openings are made between the upside connector member 23 and the downside connector member 24 on both of the right and left sides.

The paired pullout locked sections (25, 25) extend as an arc shape virtually to head downward from the right and left ends of the upside connector member 23 so as to get away from one another. The paired pullout locked sections (25, 25) are disposed on one of the sides of the upside connector member 23, namely, on the side that is nearer to the tubular section 21 than is the axial middle. That is, a clearance is formed at the axial interspace between the paired pullout locked portions (25, 25) and the opening-end seal member 22, respectively.

The paired push-in locked sections (26, 26) are extended out as an arc shape virtually to head upward from the right and left ends of the downside connector member 24 so as to get away from one another. The paired push-in locked sections (26, 26) are disposed on one of the sides of the downside connector member 24, namely, on the side that is nearer to the opening-end seat member 22 than is the axial middle. That is, a clearance is formed at the axial interspace between the paired push-in locked sections (26, 26) and the tubular section 21, respectively.

(3) Detailed Constructions of Retainer 30

Next, detailed constructions of the retainer 30 will be hereinafter explained with reference to FIG. 3A and FIG. 3B, and FIG. 4A to FIG. 4F. The retainer 30 is formed as an inverted letter-"U" shape. The retainer 30 includes a base 31, paired first legs (32, 32), paired second legs (33, 33), and paired operator portions (34, 34) for releasing.

The base 31 is located at the apex of the inverted letter-"U" shape, and is formed as a plated shape curving slightly. As illustrated in FIG. 3B, a cut-off 31a is formed on an axial inner-side lower face of the base 31. The cut-off 31a forms a clearance between the connector body 10 and the base 31 in such a state as the retainer 30 is located at the confirmation position. For example, an operator or worker uses the cut-off 31a to pull out the retainer 30 by inserting a jig, such as a screw driver, into it.

The paired first legs (32, 32) are disposed to be capable of opening expansively at the right and left opposite ends of the base 31, and allow a large expansive opening magnitude, respectively. That is, the paired first legs (32, 32) deform to open expansively to allow the annular boss 3a of the pipe 3 to pass toward an inner side. Each of the first legs (32, 32) is provided with a first leg-portion body 41, a temporarily come-off preventing portion 42, a guiding protrusion 43, and a first push-in inhibiting protrusion 44.

The first leg-portion body 41 is formed in a letter-"L" configuration extending downward from the right and left opposite ends of the base 31. The first leg-portion body 41 is formed as a letter-"L" shape whose downside front face is located on a more frontal side than is the upside front face. The letter-"L"-shaped downside of the first leg-portion body 41 bulges out onto a more right/left outer side than does the letter-"L"-shaped upside. Moreover, the letter-"L"-shaped downside of the first leg-portion body 41 has an axial width to the same extent as the axial interspace between the guide 21a of the tubular section 21 in the connector body 10 and the outside shoulder 22c (i.e., the right and left outside sites of the rail groove 22b) in the opening-end seal member 22.

Figure 4A:
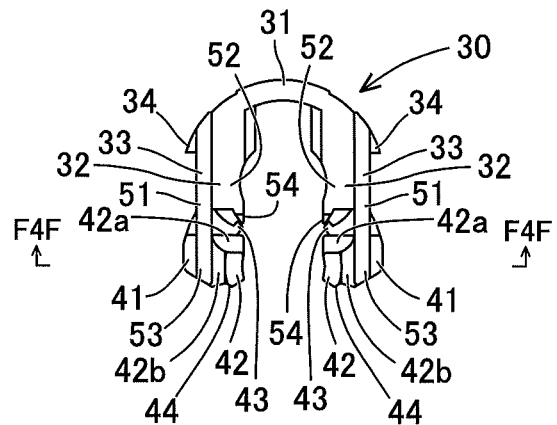
FIG. 4A is a front view of the retainer 30.
Figure 4B:
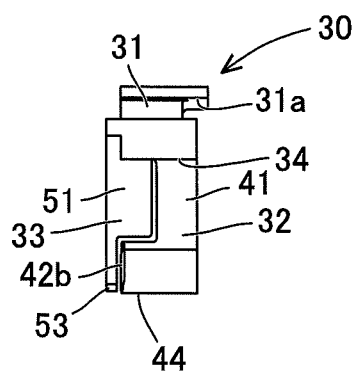
FIG. 4B is a right side view of the retainer 30 shown in FIG. 4A.
Figure 4C:
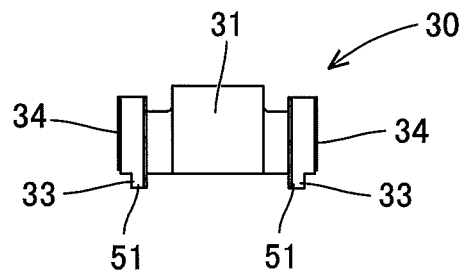
FIG. 4C is a plan view of the retainer 30 shown in FIG. 4A.
Figure 4D:
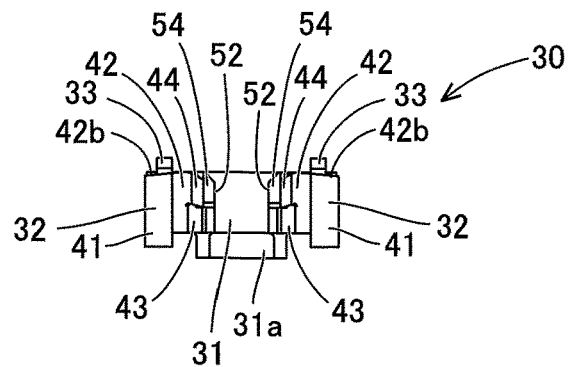
FIG. 4D is a bottom view of the retainer 30 shown in FIG. 4A.
Figure 4E:
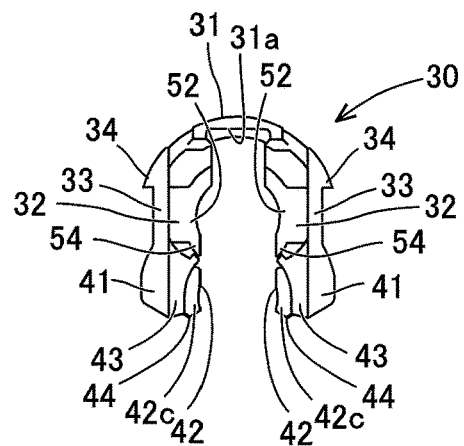
FIG. 4E is a rear view of the retainer 30 shown in FIG. 4A.

The temporary come-off preventing portion 42 is disposed so as to bulge out from an axially frontal part of each of the first leg-portion bodies (41, 41) and from the leading-end part of the first leg-portion bodies (41, 41) to the inside (i.e., aside opposing the first leg-portion bodies (41, 41)). As illustrated in FIG. 4A, the temporary come-off preventing portion 42 has a cut-off 42a on the axially frontal side and upper side. The cut-off 42a makes a region accommodating the push-in locked section 26 of the connector body 10 in such a state as the retainer 30 is located at the confirmation position. Moreover, the presence of the cut-off 42a makes a face 42b on the axially frontal side of the temporary come-off preventing portion 42 smaller than another face 42c on the axially inner side.

Figure 4F:
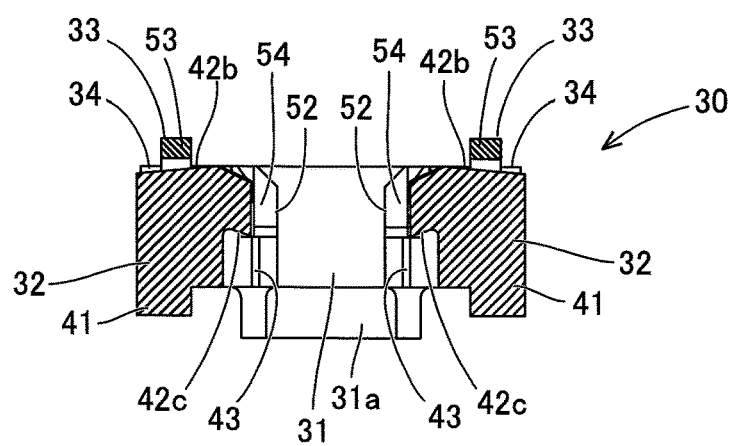
FIG. 4F is an enlarged cross-sectional diagram of the retainer 30 taken along the line "F4F"-"F4F" shown in FIG. 4A.

As illustrated in FIG. 4F, an outside range within the face 42b on the axially frontal side of the temporary come-off preventing portion 42 is formed to incline so as to be located on a more axially frontal side as heading from the outside to the inside. This outside range makes a range that opposes an inner face of the opening-end seat member 22 in the connector body 10, and which is capable of coming into contact with the inner face, in such a state as the retainer 30 is located at the initial position.

Meanwhile, an inside range within the face 42b on the axially frontal side of the temporary come-off preventing portion 42 is formed to incline so as to be located on a more axially frontal side as heading from the inside to the outside. This inside range is a range with which the annular boss 3a of the pipe 3 comes into contact in such a state as the retainer 30 is located at the initial position.

As illustrated in FIG. 4F, the face 42c on the axially inner side of the temporary come-off preventing portion 42 is formed to incline so as to be located on a more axially inner side as heading from the outside to the inside. The face 42c on the axially inner side makes a range coming into contact with the annular boss 3a of the pipe 3 in such a state as the pipe 3 is located at the regular position. That is, the face 42c on the axially inner side is capable of locking with respect to the annular boss 3a of the pipe 3 in the axial direction.

The guiding protrusion 43 is disposed so as to bulge out from an axial middle of each of the first leg-portion bodies (41, 41) and from the leading-end part (or segment) of the first leg-portion bodies (41, 41) to the inside (i.e., a side opposing the first leg-portion bodies (41, 41)). The guiding protrusion 43 is formed in such a configuration that the more it comes the upside the more it bulges out toward the inside. A lower face of the guiding protrusion 43 is formed as an arc-like dented shape corresponding to the outer peripheral face of the annular boss 3a.

Meanwhile, an upper face of the guiding protrusion 43 is formed as an arc-like dented shape corresponding to the outer peripheral face of the annular boss 3a in such a state as the retainer 30 is located at the confirmation position. Note however that an inner end within the upper face of the guiding protrusion 43 is locked with respect to the pullout locked portion 25 of the connector body 10 in the up/down direction. Moreover, an axial inner face of the guiding protrusion 43 is a face opposing against an axial front face of the tubular section 21 by way of a very minute clearance. That is, the temporary come-off preventing portion 42, and the guiding protrusion 43 provide a width between them to the virtually same extent as that of the width between the axial front face of the tubular section 21 and the axial inner face of the opening-end seat member 22.

The first push-in inhibiting protrusion 44 is disposed on a lower face of the temporary come-off inhibiting portion 42. The first push-in inhibiting protrusion 44 is locked with respect to the push-in locked section 26 of the connector body 10 in the up/down direction in such a state as the first leg 32 is not opened expansively. Note however that the first push-in inhibiting protrusion 44 is not locked with respect to the push-in locked section 26 in such another state as the first leg 32 is opened expansively.

The paired second legs (33, 33) are disposed at the right and left opposite ends of the base 31, but are disposed independently of the paired first legs (32, 32). The paired second legs (33, 33) allow only a small expansive opening magnitude compared with the expansive opening magnitude of the paired first legs (32, 32). Note however that it is even permitted that the paired second legs (33, 33) are disposed so as to be incapable of opening expansively. That is, even when the paired second legs (33, 33) are deformed to open expansively, the annular boss 3a of the pipe 3 is incapable of passing through them. In the present embodiment, the paired second legs (33, 33) are inhibited from greatly opening expansively by making an area coupling with the base 31 larger, compared with that of the paired first legs (32, 32).

Each of the second legs (33, 33) is provided with a second leg-portion body 51, an actual come-off preventing portion 52, an insertion guide 53 and a second push-in inhibiting protrusion 54.

The second leg-portion body 51 extends downward from the right and left opposite ends of the base 31. The second leg-portion body 51 is disposed on a front side of the first leg-portion body 41 by way of a clearance at the axial interspace between itself and the first leg-portion body 41. A front-side part of the second leg-portion body 51 is inserted into the rail groove 22b of the opening-end seat member 22 in the connector body 10. That is, the second leg-portion body 51 controls the retainer 30 in the attitude with respect to the connector body 10. In particular, the second leg 33 is inhibited from greatly opening expansively by the locking between the second leg-portion body 51 and the rail groove 22.

The actual come-off preventing portion 52 is disposed so as to bulge out to an inside (i.e., aside opposing the second leg-portion body 51) from a position in the respective second leg-portion bodies (51, 51) that is adjacent to the base 31. The actual come-off preventing portion 52 is located at an identical axial position with that of the temporary come-off preventing portion 42 of the first leg 32. That is, the actual come-off preventing portion 52 is located above the temporary come-off preventing portion 42. An internal side face of the actual come-off preventing portion 52 is formed as an arc-like dented shape corresponding to the intermediate portion 3c of the pipe 3. Moreover, a right/left width between the respective lower ends of the actual come-off preventing portion 52 is slightly smaller than the outside diameter of the intermediate portion 3c of the pipe 3.

The insertion guide 53 further extends downward from a frontal lower end of the second leg-portion body 51. The insertion guide 53 functions as a guide, which is to be inserted into the rail groove 22b, in such a state as the second leg-portion body 51 is prior to being inserted into the rail groove 22b. Moreover, the insertion guide 53 demonstrates, in the same manner as the second leg-portion body 51, an advantageous effect of inhibiting the second leg 33 from opening expansively in such another state as being inserted into the rail groove 22b.

The second push-in inhibiting protrusion 54 is disposed at a lower end of the actual come-off preventing portion 52 to protrude downward therefrom. The second push-in inhibiting protrusion 54 comes into contact with the annular boss 3a of the pipe 3 to inhibit the retainer 30 from moving from the initial position to the confirmation position in such a state as the annular boss 3a is located below the second push-in inhibiting protrusion 54. Since a front face of the second push-in inhibiting protrusion 54 forms an inclined face, it has a center-alignment function that results from coming into contact with the annular boss 3a.

The paired operator portions (34, 34) for releasing are disposed so as to bulge out from the opposite outer faces of the base 31 to the outside. The paired operator portions (34, 34) for releasing are formed so as to enable an operator or worker to hook his or her fingers onto them in order to pull out the retainer 30.

(4) Explanations on Operations Upon Assembling

Next, explanations will be made on operations from inserting the pipe 3 into the quick connector 1 up to a completely locked state by the retainer 30. Hereinafter, explanations will be made on each of the following: the prior-to pipe-insertion state, the pipe-insertion incomplete state, the pipe-insertion completed state, the confirmation state, and the released state.

(4-1) Prior-to Pipe-Insertion State

Explanations will be made on the prior-to pipe-insertion state with reference to FIG. 5A to FIG. 5D. The "prior-to pipe-insertion state" refers to such a state as the retainer 30 is located at the initial position with respect to the connector body 10 and the pipe 3 is before being inserted into the connector body 10.

The retainer 30 is installed from up above the axial interspace between the tubular portion 21 of the connector body 10 and the opening-end seat member 22. That is, the paired first legs (32, 32), and the paired second legs (33, 33) are inserted so as to be mounted or sit astride on the upside connector member 23.

The first leg-portion body 41 is inserted into the axial interspace between the guide 21a of the tubular portion 21 and the outside shoulder 22c of the rail groove 22b. Therefore, the retainer 30 is positioned with respect to the connector body 10 in the axial direction. Moreover, the second leg-portion body 51 and insertion guide 53 are inserted into the rail groove 22b. Therefore, the retainer 30 is positioned with respect to the connector body 10 in the right/left direction. Simultaneously, the expansive opening magnitude of the second leg 33 is controlled to fall in a minute range.

Figure 5A:
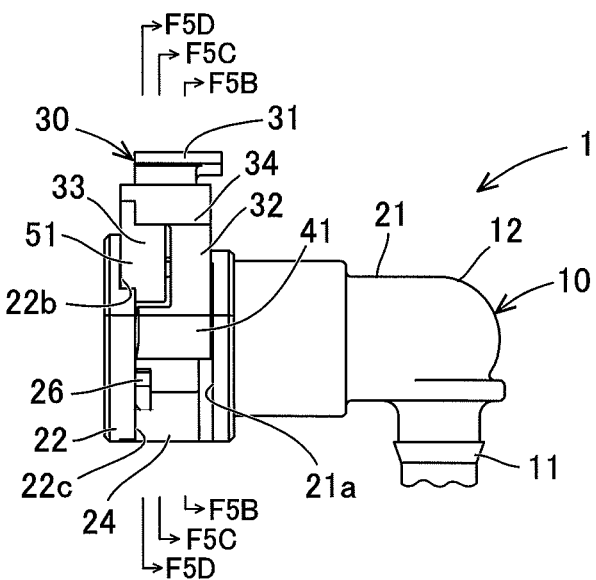
FIG. 5A is a side view illustrating a state where the retainer 30 is located at the initial position while the quick connector 1 is put in a state before the pipe 3 is inserted thereinto (i.e., a prior-to pipe-insertion state)
Figure 5B:
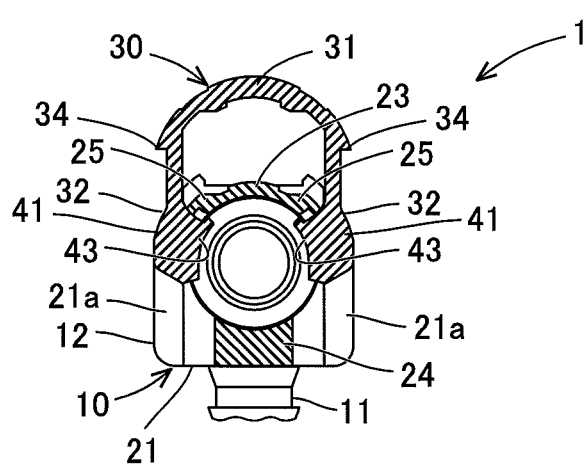
FIG. 5B is a cross-sectional diagram taken along the line "F5B"-"F5B" shown in FIG. 5A.
Figure 5C:
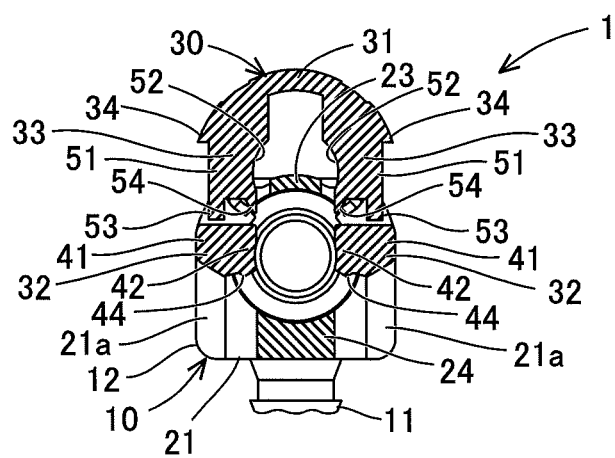
FIG. 5C is a cross-sectional diagram taken along the line "F5C"-"F5C" shown in FIG. 5A.

In addition, as illustrated in FIG. 5B, the guiding protrusion 43 of the retainer 30 is located below the pullout locked portion 25. Therefore, when a pullout load applied to the retainer 30 is small, the retainer 30 is inhibited from being pulled out from the initial position, because the upper face of the guiding protrusion 43 is locked with respect to the pullout locked portion 25 in the pullout direction.

When a large pullout load is applied to the retainer 30, the paired first legs (32, 32) are deformed to open expansively by the guiding protrusion 43 and pullout locked portion 25 that come into contact with one another, because the upper face of the guiding protrusion 43 is curved. Note however that the expansive opening of the paired first legs (32, 32) is controlled at a predetermined magnitude, because the internal end in the upper face of the guiding protrusion 43 is locked on the right and left outsides with respect to the pullout locked portion 25. That is, even when a pullout load is applied to the retainer 30, the retainer 30 is prevented from being pulled out from the initial position.

Figure 5D:
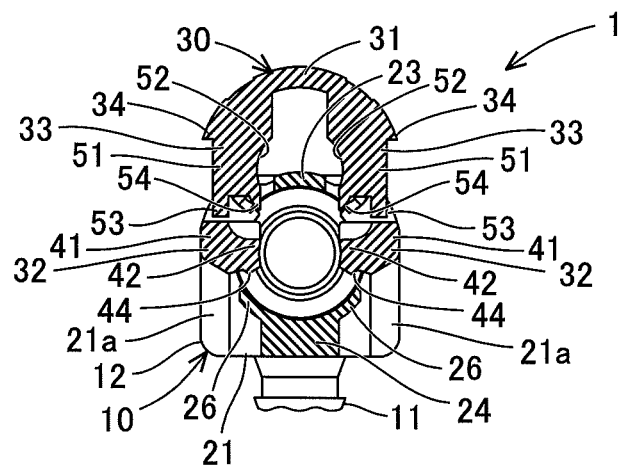
FIG. 5D is a cross-sectional diagram taken along the line "F5D"-"F5D" shown in FIG. 5A.

Moreover, as illustrated in FIG. 5D, the first push-in inhibiting protrusion 44 is located above the push-in locked portion 26. When the paired first legs (32, 32) are put in such a state as they do not open expansively, the first push-in inhibiting protrusion 44 locks to the push-in locked portion 26 in the push-in direction, and on the right and left outsides. Therefore, not only the paired first legs (32, 32) are inhibited from opening expansively, but also the retainer 30 is inhibited from being pushed in from the initial position to the confirmation position.

Under the circumstances, an inside range in the front face of the temporary come-off preventing portions (42, 42) of the paired first legs (32, 32) is located at a position where the annular boss 3a of the pipe 3 approaches or enters. That is, the temporary come-off preventing portions (42, 42) are located at a position where they are capable of coming into contact with the annular boss 3a of the pipe 3.

(4-2) Pipe-Insertion Incomplete State

Explanations will be made on the pipe-insertion incomplete state with reference to FIG. 6A to FIG. 6D. The "pipe-insertion incomplete state" refers to such a state as the retainer 30 is located at the initial position with respect to the connector body 10 and the pipe 3 is located at a midway position that is placed on a more axially frontal side than is the regular position.

When the pipe 3 is inserted into the connector body 10 from the "prior-to pipe-insertion state" shown in FIG. 5A to FIG. 5D, the leading-end portion 3b of the pipe 3 pass through the interspace between the paired first legs (32, 32) of the retainer 30 and the interspace between the paired second legs (33, 33).

Figure 6A:
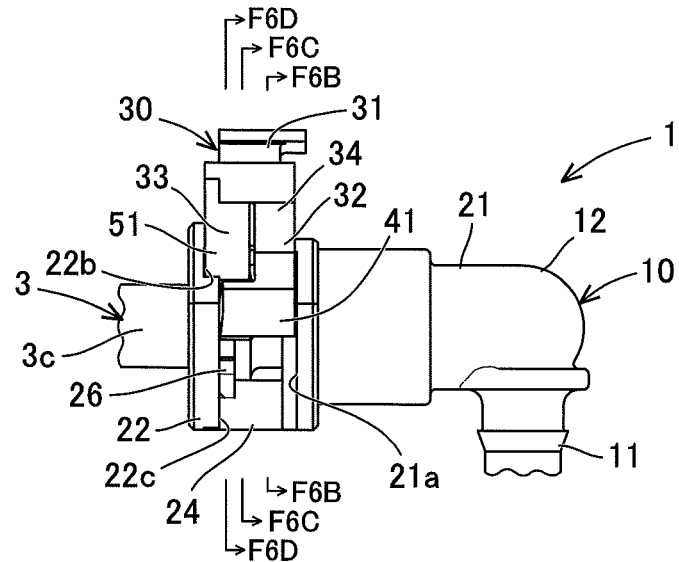
FIG. 6A is a side view illustrating another state where the retainer 30 is located at the initial position while the pipe 3 is inserted into the quick connector 1 up to a position placed short of (or behind) the regular position therein (i.e., a pipe-insertion incomplete state)
Figure 6B:
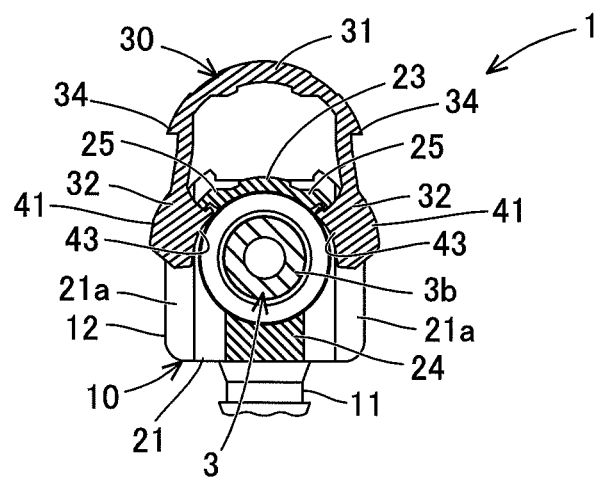
FIG. 6B is a cross-sectional diagram taken along the line "F6B"-"F6B" shown in FIG. 6A.
Figure 6C:
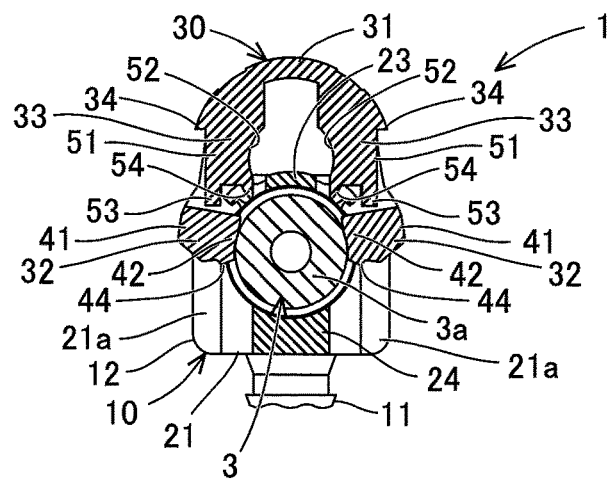
FIG. 6C is a cross-sectional diagram taken along the line "F6C"-"F6C" shown in FIG. 6A.

Subsequently, the annular boss 3a of the pipe 3 comes into contact with the inside range in the front face of the temporary coming-off preventing portion 42 of the first legs (32, 32); and simultaneously comes into contact with the front face of the second push-in inhibiting protrusion 54. As illustrated in FIG. 6C, the annular boss 3a comes into contact with the front face of the second push-in inhibiting protrusion 54 to move the retainer 30 upward slightly. Thus, the center alignment is done between the temporary come-off preventing portion 42 and the annular boss 3a.

Since the pipe 3 is further inserted into the connector body 10 toward a more axially inner side, the annular boss 3a thrusts the front face of the temporary come-off preventing portion 42 toward an inner side. As accompanied by the thrusting, the paired first legs (32, 32) deform to open expansively as shown in FIG. 6B. On this occasion, the internal end in upper top face of the guiding protrusion 43 locks with respect to the pullout locked section 25 on the right and left outsides. Consequently, the expansive opening of the paired first legs (32, 32) is controlled at a predetermined magnitude so that such a state as the retainer 30 is retained to the connector body 30 is maintained.

Note herein that, since the paired first legs (32, 32) are deformed to open expansively due to the thrusting onto the temporary come-off preventing portion 42 by the annular boss 3a, the locking between the first push-in inhibiting protrusion 44 and the push-in locked section 26 is canceled.

Therefore, the first push-in inhibiting protrusion 44 does not demonstrate the advantageous push-in inhibiting effect under the circumstances.

However, under the circumstances, the second push-in inhibiting protrusion 54 is located at an axially identical position with that of the temporary come-off preventing portion 42. Consequently, the second push-in inhibiting protrusion 54 is located radially outward to the annular boss 3a. Moreover, the paired second legs (33, 33) do not open so expansively as enabling the maximum-diameter portion of the annular boss 3a to pass through them. Therefore, the second push-in inhibiting protrusion 54 comes into contact with the annular boss 3a in the push-in direction of the retainer 30 to inhibit the retainer 30 from being pushed in from the initial position to the confirmation position.

(4-3) Pipe-Insertion Completed State

Explanations will be made on the pipe-insertion completed state with reference to FIG. 7A to FIG. 7E. The "pipe-insertion completed state" refers to such a state as the retainer 30 is located at the initial position with respect to the connector body 10 and the pipe 3 is located at the regular position.

When the pipe 3 is further inserted into the connector body 10 toward a more inner side from the "pipe-insertion incomplete state" shown in FIG. 6A to FIG. 6D, the annular boss 3a of the pipe 3 pass the temporary come-off preventing portion 42, and then the annular boss 3a arrives at a position at which the guiding protrusion 43 exists. The "regular position" is a position of the pipe 3 that is put in such a state as the annular boss 3a is located at the position where the guiding protrusion 43 is.

Since the pipe 3 arrives at the regular position so that the annular boss 3a is located below the guiding protrusion 43, the locking between the temporary come-off preventing portion 42 and the annular boss 3a is canceled, and then the expansive-opening deformation magnitude of the paired first legs (32, 32) decreases instantaneously. While the expansive-opening deformation magnitude of the paired first legs (32, 32) is decreasing, the retainer 30 is not controlled at all by the pipe 3 and connector body 10. Consequently, when the pipe 3 arrives at the regular position, noises occur, noises which are accompanied by the return of the paired first legs (32, 32) backed from deforming to open expansively. In particular, high-frequency noises arise due to vibrations of the retainer 30, because the retainer 30 is not controlled at all. The noises enable an operator or worker to confirm that the pipe 3 arrives at the regular position.

In such a state as the pipe 3 is located at the regular position, the guiding protrusion 43 is located at the interspace between the annular boss 3a and the paired pullout locked sections (25, 25) in the up/down direction. The upward/downward position of the retainer 30 is determined to a certain extent by the relationship between the lower face of the guiding protrusion 43 and the outer peripheral-face configuration of the annular boss 3a, and by the relationship between the upper face of the guiding protrusion 43 and the lower face of the pullout locked section 25.

Under the circumstances, the annular boss 3a is interposed between the temporary come-out preventing portion 42 and the bushing 74 in the axial direction. That is, the temporary come-out preventing portion 42 locks with respect to the annular boss 3a in the axial direction to prevent the pipe 3 from coming off.

Note herein that, when a pullout load is applied to the pipe 3, the annular boss 3a thrusts the face 42c on the axially inner side of the temporary come-out preventing portion 42 toward the frontal side, and moreover the outside range in the face 42b on the axially frontal side of the temporary come-off preventing portion 42 thrusts the opening-end seat member 22 in the connector body 10 toward the frontal side.

The outside range in the face 42b on the axially frontal side of the temporary come-off preventing portion 42 is formed to incline so as to be located on a more axially frontal side as heading from the outside to the inside. Consequently, a force acts on the paired first legs (32, 32) in a direction not allowing them to open expansively, due to the thrusting onto the opening-end seat member 22 by the temporary come-out preventing portion 42.

Besides, the face 42c on the axially inner side of the temporary come-off preventing portion 42 is formed to incline so as to be located on a more axially inner side as heading from the outside to the inside. Consequently, another force acts on the paired first legs (32, 32) in the direction not allowing them to open expansively, due to the thrusting onto the temporary come-off preventing portion 42 by the annular boss 3a. That is, forming the axially frontal-side face 42 band inner-side face 42c of the temporary come-off preventing portion 42 to incline leads to enhancing the force that results from the temporary come-off preventing portion 42 to prevent the pipe 3 from coming off.

(4-4) Confirmation State

Explanations will be made on the confirmation state with reference to FIG. 8A to FIG. 8D. The "confirmation state" refers to such a state as the pipe 3 is located at the regular position and the retainer 30 is located at the confirmation position.

In the pipe-insertion completed state shown in FIG. 7A to FIG. 7E, the guiding protrusion 43 is located at a position at which it is capable of contacting an upper site within the outer peripheral face of the annular boss 3a. When a push-in load is applied to the retainer 30 to push it into the connector body 10 from the state, the lower face of the guiding protrusion 43 is guided by the outer peripheral face of the annular boss 3, and accordingly the paired first legs (32, 32) deform to open expansively while moving downward. Simultaneously, the expansive opening deformation of the paired first legs (32, 32) results in canceling the locking between the first push-in inhibiting protrusion 44 and the push-in locked section 26. Therefore, the operation of inhibiting the retainer 30 from moving from the initial position to the confirmation position is canceled.

To keep applying the push-in load to the retainer 30 leads to moving the retainer 30 to the confirmation position while the second leg-portion body 51 and insertion guide 53 are being guided by the rail groove 22b, as shown in FIG. 8A to FIG. 8D. On this occasion, since the guiding protrusion 43 is freed from being guided by the outer peripheral face of the annular boss 3a, the paired first legs (32, 32) return back to deforming to open expansively. Consequently, the annular boss 3a is located above the upper face of the guiding protrusion 43. Therefore, the guiding protrusion 43 locks with respect to the annular boss 3a in the pullout direction of the retainer 30. That is, the guiding protrusion 43 inhibits the retainer 30 from moving in the pullout direction. As a result, the retainer 30 is prevented from being easily pulled out in the confirmation state.

Note herein that the right/left width between the respective lower ends of the actual come-out preventing portion 33 of the second leg 33 is slightly smaller than the outside diameter of the intermediate portion 3c of the pipe 3. Consequently, the paired second legs (33, 33) deform to slightly open expansively upon being pushed in from the initial position to the confirmation position, because of the actual come-off preventing portion 52 that is guided by the intermediate portion 3c of the pipe 3. However, as the second leg-portion body 51 is regulated by the rail groove 22b, the expansive opening magnitude of the paired second legs (33, 33) is very minute, compared with the expansive opening magnitude of the paired first legs (32, 32). Thereafter, when the intermediate portion 3c of the pipe 3 is positioned on the arc-like dented shaped part of the inner surface of the actual come-off preventing portion 52, the expanded deformation of the paired second legs (33, 33) are restored.

Note that, in the present embodiment, the paired second legs (33, 33) are set to deform to open expansively, although slightly. However, it is also possible to set the paired second legs (33, 33) not to deform to open expansively at all. If such is the case, it is allowable to make the right/left width between the respective lower ends of the actual come-off preventing portion 52 equal to or more than the outside diameter of the intermediate portion 3c of the pipe 3.

In addition, the annular boss 3a opposes the axially-inner-side face of the actual come-off preventing portion 52 in the confirmation state. The actual come-off preventing portion 52 is formed on the paired second legs (33, 33) that are inhibited from greatly opening expansively. Consequently, as far as the retainer 30 is located at the confirmation position, the actual come-off preventing portion 52 locks with a firm force with respect to the annular boss 3a in the axial direction. Therefore, the pipe 3 is securely prevented from coming off.

Figure 8A:
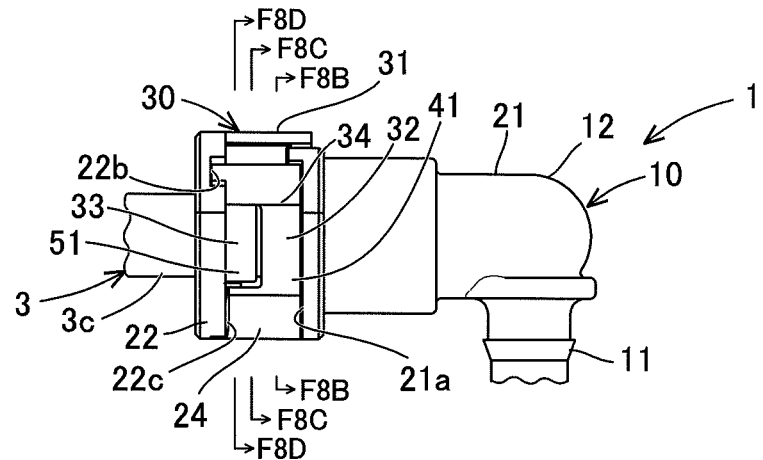
FIG. 8A is a side view illustrating yet another state where the retainer 30 has been moved from the initial position to the confirmation position (i.e., a confirmation state)
Figure 8B:
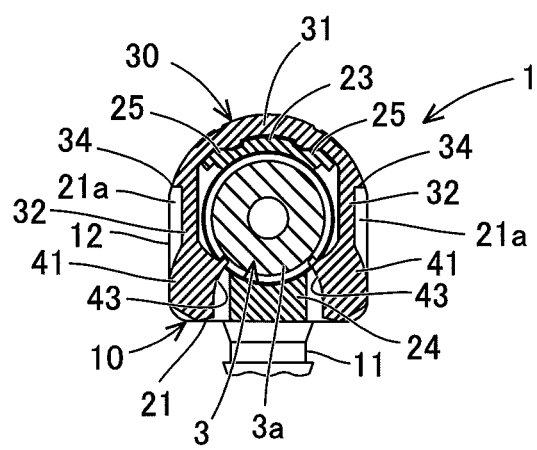
FIG. 8B is a cross-sectional diagram taken along the line "F8B"-"F8B" shown in FIG. 8A.
Figure 8C:
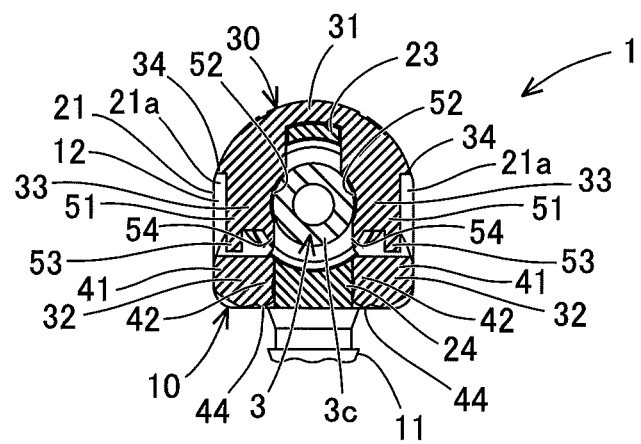
FIG. 8C is a cross-sectional diagram taken along the line "F8C"-"F8C" shown in FIG. 8A.
Figure 8D:
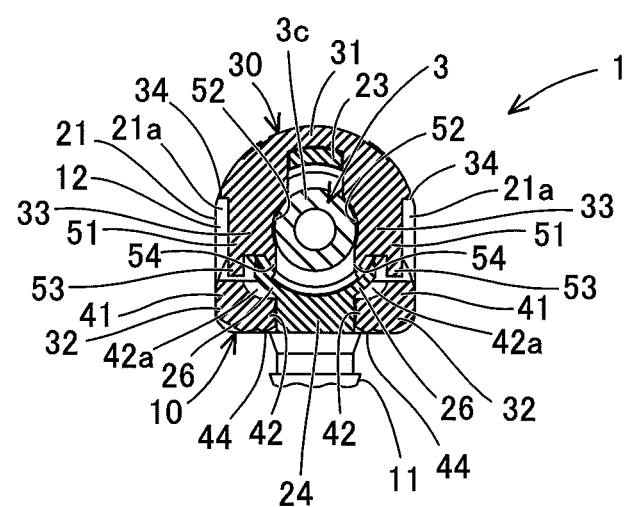
FIG. 8D is a cross-sectional diagram taken along the line "F8D"-"F8D" shown in FIG. 8A.

Moreover, as illustrated in FIG. 8D, the push-in locked section 26 is located in the region within the cut-off 42a of the temporary come-off preventing portion 42 in the confirmation state. In addition, the push-in locked section 26 is located below the actual come-off preventing portion 52 and second push-in inhibiting portion 54.

(4-5) Released State

Explanations will be made on the released state with reference to FIG. 6B to FIG. 6D, FIG. 7A to FIG. 7E and FIG. 8A to FIG. 8D. Such cases arise as the pipe 3 should be pulled from out of the connector body 10 for maintenance, and the like. The "released state" refers to a state where it is possible to pull the pipe 3 from out of the connector 30 in such a state as the pipe 3 is located at the regular position.

The retainer 30 is moved to the initial position shown in FIG. 7A to FIG. 7D from the state shown in FIG. 8A to FIG. 8D where it is located at the confirmation position. In order to do so, an operator or worker hooks his or her fingers onto the paired releasing operator portions (34, 34) of the retainer 30, and then applies a pullout load to the retainer 30. If so, the retainer 30 moves from the confirmation position to the initial position while the guiding protrusion 43 is being guided by the outer peripheral face of the annular boss 3a.

Note that it is also possible for the operator or worker to insert a jig, such as a screw driver, into the cut-off 31a (shown in FIG. 4B) of the base 31 to move the retainer 30 from the confirmation position to the initial position, instead of the hooking operation onto the paired releasing operator portions (34, 34), or in addition to the hooking operation.

Figure 6D:
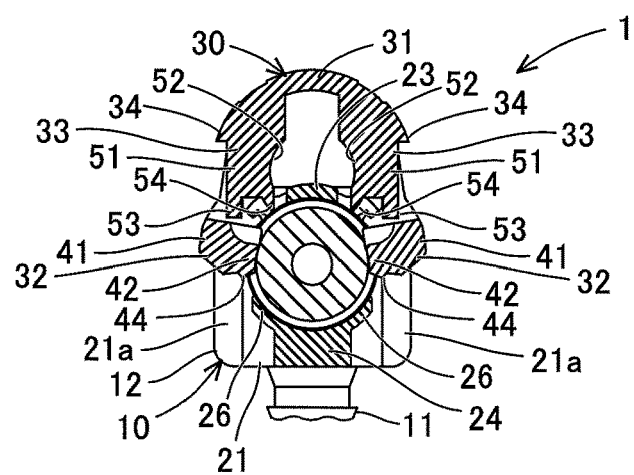
FIG. 6D is a cross-sectional diagram taken along the line "F6D"-"F6D" shown in FIG. 6A.

Even when the retainer 30 has moved to the initial position, the temporary come-off preventing portion 42 locks to the annular boss 3a in the axial direction as shown in FIG. 7C to FIG. 7E. Hence, in such a state as the retainer 30 is located at the initial position, the operator or worker hooks his or her fingers onto the paired releasing operator portions (34, 34) to apply an additional pullout load to the retainer 30. If so, the retainer 30 moves to the position shown in FIG. 6B to FIG. 6D. That is, as the upper face of the guiding protrusion 43 in the paired first legs (32, 32) is guided by the paired pullout locked sections (25, 25), the paired first leg portions (32, 32) deform to open expansively.

By the deformation of the paired first legs (32, 32) to open expansively to cancel the locking between the temporary come-off preventing portion 42 and the annular boss 3a. Under the circumstances, it is possible for the operator or worker to pull the pipe 3 from out of the connector body 10.

(5) Advantageous Effects of Present Embodiment

As described above, the quick connector 1 comprises the connector body 10, and the retainer 30. The connector body 10 is made so as to enable the pipe 3 having the annular boss 3a to be inserted into it. In such a state as the pipe 3 is inserted into the connector body 10 to the regular position (i.e., the position shown in FIG. 7A) in the axial direction, the retainer 30 is moved from the initial position (i.e., the position shown in FIG. 7A) to the confirmation position (i.e., the position shown in FIG. 8A) with respect to the connector body 10 by a push-in operation toward a direction that intersects with the axial direction of the connector body 10. Then, the retainer 30 prevents the pipe 3 from coming off by axially locking to the annular boss 3a at the confirmation position.

The retainer 30 includes the base 31, the paired first legs (32, 32) disposed at opposite ends of the base 31, and being capable of opening expansively, and the paired second legs (33, 33) disposed at the opposite ends of the base 31, disposed independently of the paired first legs (32, 32), and exhibiting a smaller expansive opening magnitude than that of the paired first legs (32, 32).

Note herein that the paired first legs (32, 32) are provided with the first push-in inhibiting protrusion 44 disposed on a leading-end side of the paired first legs (32, 32), and inhibiting the retainer 30 from moving from the initial position to the confirmation position, respectively. The paired second legs (33, 33) are provided with the second push-in inhibiting protrusion 54 disposed on a leading-end side of the paired second legs (33, 33), and inhibiting the retainer 30 from moving from the initial position to the confirmation position, respectively.

As illustrated in FIG. 5D, the first push-in inhibiting protrusion 44 inhibits the retainer 30 from moving from the initial position to the confirmation position by being locked to the connector body 10 in such a state as the retainer 30 is located at the initial position and the pipe 3 is not inserted into connector body 10.

In addition, as illustrated in FIG. 6D, the paired first legs (32, 32) deform to open expansively, accompanied by coming into contact with the annular boss 3a, to cancel the locking of the first push-in inhibiting protrusion 44 to the connector body 10 in such a state as the retainer 30 is located at the initial position and the pipe 3 is located at a midway position at which it is located on a more axially frontal side than is the regular position.

As illustrated in FIG. 6D, the second push-in inhibiting protrusion 54 comes into contact with the annular boss 3a of the pipe 3 in the direction of pushing the retainer 30 to inhibit the retainer 30 from moving from the initial position to the confirmation position in such a state as the retainer 30 is located at the initial position and the pipe 3 is located at the midway position.

That is, each of the paired first legs (32, 32) and paired second legs (33, 33) is provided with the push-in inhibiting protrusions (44, 54). Therefore, in the two states, the first push-in inhibiting protrusion 44 and second push-in inhibiting protrusion 54 make it feasible to inhibit the retainer 30 from being pushed in. To put it in detail, the first push-in inhibiting protrusion 44 functions in such a state as the pipe 3 is not inserted. The second push-in inhibiting protrusion 54 functions in such another state as the pipe 3 is located at the midway position. Therefore, even in the other state where the pipe 3 is located at the midway position, the pipe 3 comes not to undergo any push-in movements.

Figure 3A:
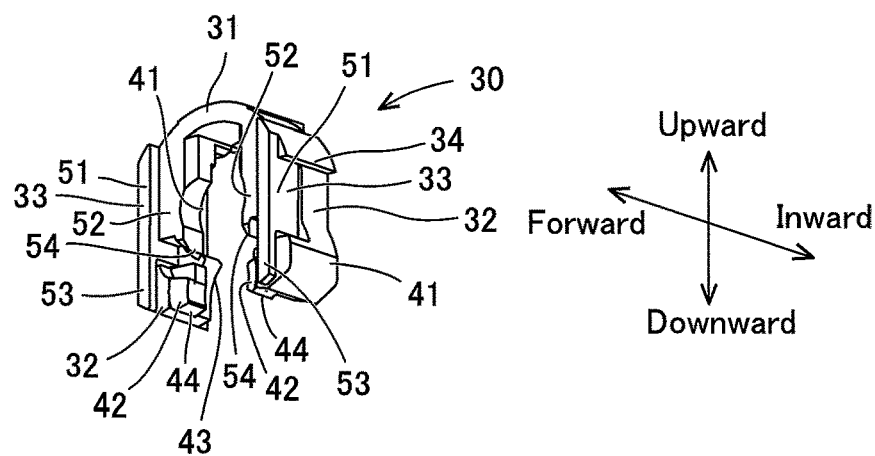
FIG. 3A is a perspective diagram in which the retainer 30 shown in FIG. 1 is viewed on the frontal side from down below.
Figure 3B:
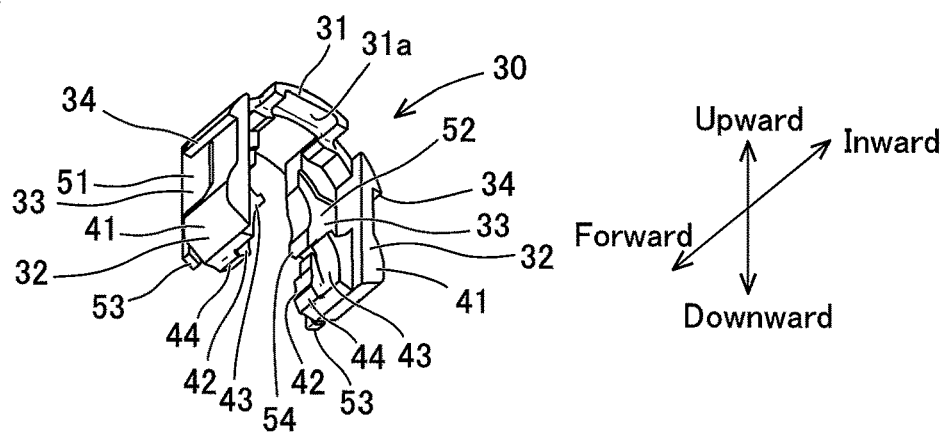
FIG. 3B is a perspective diagram in which the retainer 30 shown in FIG. 1 is viewed on the inner side from down below.

Moreover, as illustrated in FIG. 3A and FIG. 3B, the paired second legs (33, 33) are provided with the actual come-off preventing portion 52 that locks to the annular boss 3a in the axial direction to prevent the pipe 3 from coming off in such a state as the pipe 3 is inserted into the connector body 10 to the axially regular position therein and the retainer 30 is located at the confirmation position.

Forming the actual come-off preventing portion 52 on the paired second legs (33, 33) whose expansive opening magnitude is smaller makes the come-off preventing force resulting from the actual come-off preventing portion 52 higher. That is, in such a state as the actual come-off preventing portion 52 inhibits the annular boss 3a from moving, it is possible to securely inhibit the pipe 3 from being pulled from out of the connector body 10.

Moreover, the first push-in inhibiting protrusion 44 and actual come-off preventing portion 52 are located at an identical position in the axial direction, and are located on a more axially frontal side than is the annular boss 3a, respectively, in such a state as the pipe 3 is located at the regular position. The retainer 30 does not have any site that exists to oppose a face on the axially inner side of the annular boss 3a in such another state as the pipe 3 is located at the regular position and the retainer 30 is located at the confirmation position. In the present embodiment, the bushing 74 is located at a position that is adjacent to a face on the axially inner side of the annular boss 3a. Constructing the first push-in inhibiting protrusion 44 and actual come-off preventing portion 52 as aforementioned leads to making it possible to arrange the bushing 74 at a position that is adjacent to the annular boss 3a. As a consequence, the annular boss 3a is inhibited from getting axially rickety with respect to the quick connector 1 in the other state where the pipe 3 is located at the regular position and the retainer 30 is located at the confirmation position. Eventually, the pipe 3 is inhibited from getting axially rickety with respect to the quick connector 1.

Moreover, the connector body 10 has opposing inhibitor faces (i.e., the front face of the guide 21a, and the inner face of the outside shoulder 22c) that oppose one another in the axial direction, and which inhibit the retainer 30 from moving toward both the axially opposite directions with respect to the connector body 10. Each of both the axially opposite end faces of the paired first legs (32, 32) opposes each of the opposing inhibitor faces (21a, 22c); and accordingly, the opposing inhibitor faces (21a, 22c) inhibit the paired first legs (32, 32) from moving toward both the axially opposite directions.

Interposing the paired first legs (32, 32) themselves between the opposing inhibitor faces (21a, 22c) results in inhibiting the retainer 30 from moving toward both the axially opposite directions. That is, it is not necessary for the paired second legs (33, 33) to exhibit an inhibiting force against the axial movements of the retainer 30. That is, interposing the paired first legs (32, 32) individually between the opposing inhibitor faces (21a, 22c) of the connector body 10 leads to inhibiting the retainer 30 from getting axially rickety with respect to the connector body 10.

Moreover, the paired first legs (32, 32) are provided with the temporary come-off inhibiting portion 42, respectively. The temporary come-off inhibiting portion 42 allows the annular boss 3a to pass toward an inner side by deforming the paired first legs (32, 32) to open expansively as accompanied by coming into contact with the annular boss 3a in such a state as the retainer 30 is located at the initial position. In addition, the temporary come-off inhibiting portion 42 axially locks to the annular boss 3a to prevent the pipe 3 from coming off by decreasing the expansive opening magnitude of the paired first legs (32, 32) when the pipe 3 has arrived at the regular position in the state where the retainer 30 is located at the initial position.

The temporary come-off preventing portion 42 is disposed on the paired first legs (32, 32), and the actual come-off preventing portion 52 is disposed on the paired second legs (33, 33). Separating the temporary come-off preventing portion 42 and the actual come-off preventing portion 52 thus from one another results in enabling them to demonstrate the respective functions securely and effectively.

Moreover, the face 42b on the axial frontal side of the temporary come-off preventing portion 42 is formed to incline so as to come into contact with the connector body 10, and so as to be located on a more axially frontal side as heading from the outside to the inside. In such a state as the retainer 30 is located at the initial position, and when a force acts on the pipe 3 to pull it from out of the regular position, the temporary come-off preventing portion 42 receives the pullout force from the annular boss 3a. If so, the temporary come-off preventing portion 42 comes into contact with the connector body 10. On this occasion, forming the face 42b on the axially frontal side of the temporary come-off inhibiting portion 42 to incline as aforementioned results in subjecting the paired first legs (32, 32) to a force that acts on them to deform in such a direction as not letting them open expansively. Therefore, forming the face 42b on the axially frontal side of the temporary come-off inhibiting portion 42 to incline leads to enhancing a force that the temporary come-off preventing portion 42 exerts to prevent the pipe 3 from coming off.

In addition, the face 42c on the axially inner side of the temporary come-off preventing portion 42 is formed to incline so as to come into contact with the annular boss 3a, and so as to be located on a more axially inner side as heading from the outside to the inside. Consequently, the annular boss 3a is thrusted onto the temporary come-off inhibiting portion 42; and accordingly the paired first legs (32, 32) are subjected to a force that acts on them to deform in such a direction as not letting them open expansively. That is, forming the face 42c on the axially inner side of the temporary come-off inhibiting portion 42 to incline results in enhancing the force that the temporary come-off preventing portion 42 exerts to prevent the pipe 3 from coming off.

What is claimed is:

1. A quick connector comprising:
   a connector body into which a pipe having an annular boss is insertable; and
   a retainer moving from an initial position to a confirmation position with respect to the connector body by a push-in operation in a direction that intersects with an axial direction of the connector body in such a state as the pipe is inserted into the connector body to a regular position in the axial direction of the connector body, the retainer preventing the pipe from coming off by axially locking to the annular boss at the confirmation position;
   the retainer including:
   a base;
   paired first legs disposed at opposite ends of the base, and being capable of opening expansively; and
   paired second legs disposed at the opposite ends of the base, disposed independently of the paired first legs, and exhibiting a smaller expansive opening magnitude than that of the paired first legs;
   the paired first legs provided with a first push-in inhibiting protrusion disposed on a leading-end side of the paired first legs, and inhibiting the retainer from moving from the initial position to the confirmation position;
   the paired second legs provided with a second push-in inhibiting protrusion disposed on a leading-end side of the paired second legs, and inhibiting the retainer from moving from the initial position to the confirmation position;
   the first push-in inhibiting protrusions inhibiting the retainer from moving from the initial position to the confirmation position by being locked to the connector body in such another state as the retainer is located at the initial position and the pipe is not inserted into the connector body;
   the first push-in inhibiting protrusions canceling the locking to the connector body by the paired first legs that open expansively accompanied by coming into contact with the annular boss in such still another state as the retainer is located at the initial position and the pipe is located at a midway position that is located on a more axially frontal side than is the regular position; and
   the second push-in inhibiting protrusions inhibiting the retainer from moving from the initial position to the confirmation position by coming into contact with the annular boss of the pipe in a direction of pushing in the retainer in the still other state where the retainer is located at the initial position and the pipe is located at the midway position.

2. The quick connector according to claim 1, wherein the paired second legs are further provided with an actual come-off preventing portion axially locking to the annular boss to prevent the pipe from coming off in such yet another state as the pipe is inserted into the connector body to the regular position in the axial direction of the connector body and the retainer is located at the confirmation position.

3. The quick connector according to claim 2, wherein the first push-in inhibiting protrusions and the actual come-off preventing portions are located at an axially identical position, and are located on a more axially frontal side than is the annular boss in the state where the pipe is located at the regular position.

4. The quick connector according to claim 1, wherein:
   the connector body further has opposing inhibitor faces including faces that axially oppose one another, and which inhibit the retainer from moving toward both axially opposite directions thereof with respect to the connector body;
   each of axial opposite end faces in the paired first legs faces each of the opposing inhibitor faces; and
   the paired first legs are inhibited from moving toward both the axially opposite directions by the opposing inhibitor faces.

5. The quick connector according to claim 1, wherein the paired first legs are further provided with a temporary come-off inhibiting portion allowing the paired first legs to pass the annular boss toward an inner side by deforming the paired first legs to open expansively accompanied by coming into contact with the annular boss in such a state as the retainer is located at the initial position, the temporary come-off inhibiting portion axially locking to the annular boss to inhibit the pipe from coming off by decreasing an expansive opening magnitude of the paired first legs when the pipe has arrived at the regular position.

6. The quick connector according to claim 5, wherein an axially frontal-side face of the temporary come-off inhibiting portion comes into contact with the connector body, and is formed to incline so as to be located on a more axially frontal side as heading from an outside thereof to an inside thereof.

7. The quick connector according to claim 5, wherein an axially inner-side face of the temporary come-off inhibiting portion comes into contact with the annular boss, and is formed to incline so as to be located on a more axially inner side as heading from an outside thereof to an inside thereof.

8. A quick connector comprising:
a connector body into which a pipe having an annular boss is insertable; and
a retainer moving from an initial position to a confirmation position with respect to the connector body by a push-in operation in a direction that intersects with an axial direction of the connector body in such a state as the pipe is inserted into the connector body to a regular position in the axial direction of the connector body, the retainer preventing the pipe from coming off by axially locking to the annular boss at the confirmation position;
the retainer including:
a base;
paired first legs disposed at opposite ends of the base, and being capable of opening expansively; and
paired second legs disposed at the opposite ends of the base, disposed independently of the paired first legs, and being incapable of opening expansively;
the paired first legs provided with a first push-in inhibiting protrusion disposed on a leading-end side of the paired first legs, and inhibiting the retainer from moving from the initial position to the confirmation position;
the paired second legs provided with a second push-in inhibiting protrusion disposed on a leading-end side of the paired second legs, and inhibiting the retainer from moving from the initial position to the confirmation position;
the annular boss located on a more axially inner side than are the second push-in inhibiting protrusions when the pipe is located at the regular position;
the annular boss located at an axial position in the second push-in inhibiting protrusions when the pipe is located at a midway position that is on a more axially frontal side than is the regular position;
the first push-in inhibiting protrusions inhibiting the retainer from moving from the initial position to the confirmation position by being locked to the connector body in such another state as the retainer is located at the initial position and the pipe is not inserted into the connector body;
the first push-in inhibiting protrusions cancelling the locking to the connector body by the paired first legs that open expansively accompanied by coming into contact with the annular boss in such still another state as the retainer is located at the initial position and the pipe is located at the regular position, thereby allowing the retainer to move from the initial position to the confirmation position;
the second push-in inhibiting protrusions locating on a more axially frontal side than is the annular boss of the pipe in the still another state where the retainer is located at the initial position and the pipe is located at the regular position, thereby allowing the retainer to move from the initial position to the confirmation position;
the first push-in inhibiting protrusions canceling the locking to the connector body by the paired first legs that open expansively accompanied by coming into contact with the annular boss in such still another state as the retainer is located at the initial position and the pipe is located at the midway position; and
the second push-in inhibiting protrusions inhibiting the retainer from moving from the initial position to the confirmation position by coming into contact with the annular boss of the pipe in a direction of pushing in the retainer in the still other state where the retainer is located at the initial position and the pipe is located at the midway position.

9. The quick connector according to claim 8, wherein the paired second legs are further provided with an actual come-off preventing portion axially locking to the annular boss to prevent the pipe from coming off in such yet another state as the pipe is inserted into the connector body to the regular position in the axial direction of the connector body and the retainer is located at the confirmation position.

10. The quick connector according to claim 9, wherein the first push-in inhibiting protrusions and the actual come-off preventing portions are located at an axially identical position, and are located on a more axially frontal side than is the annular boss in the state where the pipe is located at the regular position.

11. The quick connector according to claim 8, wherein:
the connector body further has opposing inhibitor faces including faces that axially oppose one another, and which inhibit the retainer from moving toward both axially opposite directions thereof with respect to the connector body;
each of axial opposite end faces in the paired first legs faces each of the opposing inhibitor faces; and
the paired first legs are inhibited from moving toward both the axially opposite directions by the opposing inhibitor faces.

12. The quick connector according to claim 8, wherein:
the paired first legs are further provided with a temporary come-off inhibiting portion allowing the paired first legs to pass the annular boss toward an inner side by deforming the paired first legs to open expansively accompanied by coming into contact with the annular boss in such a state as the retainer is located at the initial position, the temporary come-off inhibiting portion axially locking to the annular boss to inhibit the pipe from coming off by decreasing an expansive opening magnitude of the paired first legs when the pipe has arrived at the regular position; and
the first push-in inhibiting protrusions partially make the temporary come-off inhibiting portion.

13. The quick connector according to claim 12, wherein an axially frontal-side face of the temporary come-off inhibiting portion comes into contact with the connector body, and is formed to incline so as to be located on a more axially frontal side as heading from an outside thereof to an inside thereof.

14. The quick connector according to claim 12, wherein an axially inner-side face of the temporary come-off inhibiting portion comes into contact with the annular boss, and is formed to incline so as to be located on a more axially inner side as heading from an outside thereof to an inside thereof.

15. The quick connector according to claim 8, wherein:
an expansive opening magnitude of the paired first legs makes a regular expansive opening magnitude in such a state as the retainer is located at the initial position and the pipe is located at the regular position;
another expansive opening magnitude of the paired first legs makes a midway expansive opening magnitude in such another state as the retainer is located at the initial position and the pipe is located at the midway position; and
the midway expansive opening magnitude is larger than the regular expansive opening magnitude.

16. The quick connector according to claim 12, wherein:
an expansive opening magnitude of the paired first legs makes a regular expansive opening magnitude in such a state as the retainer is located at the initial position and the pipe is located at the regular position;
another expansive opening magnitude of the paired first legs makes a midway expansive opening magnitude in such another state as the retainer is located at the initial position and the pipe is located at the midway position;
the midway expansive opening magnitude is larger than the regular expansive opening magnitude;
the annular boss is located at an axial position in the second push-inhibiting portions, and is located at an axial position in the temporary come-off inhibiting portion when the pipe is located at the midway position; and
the annular boss presses the temporary come-off inhibiting portion, which the paired first legs includes, in an expansive opening direction in such a state as the pipe is located at the midway position, thereby opening the paired first legs expansively by the midway expansive opening magnitude.

17. The quick connector according to claim 8, wherein the paired second legs are further provided with an insertion guide not only guiding the paired second legs with respect to the connector body in a push-in direction but also inhibiting the paired second legs from opening expansively.

* * * * *